United States Patent [19]

Naumann et al.

[11] 3,798,001

[45] Mar. 19, 1974

[54] APPARATUS AND METHOD FOR DISCERNING AN INDICATOR REACTION POINT

[75] Inventors: Peter Naumann, Stockelsdorf; Hans Möller, Lubeck, both of Germany

[73] Assignee: Dragerwerk Aktiengesellschaft, Lubeck, Maislinger Allee, Germany

[22] Filed: Mar. 29, 1972

[21] Appl. No.: 239,233

[30] Foreign Application Priority Data
May 7, 1971 Germany............................ 2122586

[52] U.S. Cl............ 23/232 R, 23/253 TP, 252/408, 356/244, 356/246
[51] Int. Cl............................................ G01n 21/06
[58] Field of Search..... 23/232 R, 253 TP; 252/408; 356/244, 246

[56] References Cited
UNITED STATES PATENTS

| | | | |
|---|---|---|---|
| 2,174,349 | 9/1939 | Littlefield.......................... | 23/232 R |
| 2,487,077 | 11/1949 | Shepherd........................ | 23/253 TP |
| 2,880,072 | 3/1959 | Grosskopf....................... | 23/232 R |
| 2,939,768 | 6/1960 | Grosskopf....................... | 23/232 R |
| 3,025,142 | 3/1962 | Williams......................... | 23/232 R |
| 3,068,073 | 12/1962 | Stanford.......................... | 23/232 R |
| 3,119,670 | 1/1964 | Mitchell.......................... | 23/232 R |
| 3,350,175 | 10/1967 | Willis.............................. | 23/253 TP |
| 3,545,930 | 12/1970 | Walker............................ | 23/232 R |

*Primary Examiner*—Morris O. Wolk
*Assistant Examiner*—Sidney Marantz
*Attorney, Agent, or Firm*—McGlew & Tuttle

[57] ABSTRACT

A method for readily discerning an indicator reaction point between an indicator preparation having a first color and a reaction substance which is to be identified and which has a second different color where the reaction is such that there is a third color formed in a transition between the first two colors comprises passing the substance to be identified through a transparent vessel having an indicator preparation therein, and observing the separating line between the first and second colors by viewing through the third color so as to obscure the third color. A device which may be used for such testing comprises, for example, a test tube having a transparent wall of a color comparable to the color of transition between the first and second colors so that when viewing through the test tube, the transition color is obscured and the separation between the first and second color becomes clear. The tube may be formed with the wall of the third color or a transparent foil of the third color may be wrapped around the exterior surface thereof.

6 Claims, 2 Drawing Figures

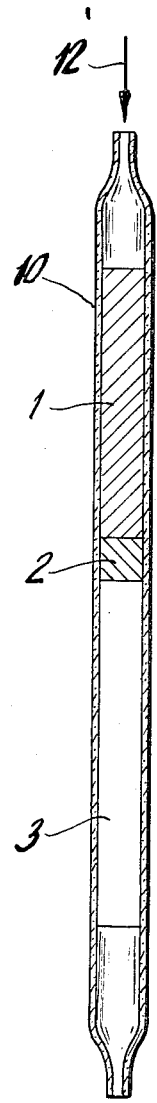
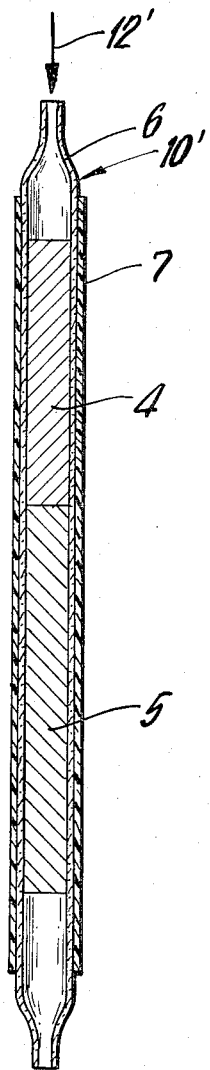
(PRIOR ART)
FIG.1
FIG.2

APPARATUS AND METHOD FOR DISCERNING AN INDICATOR REACTION POINT

BACKGROUND OF THE INVENTION

1. Field of the Invention

This invention relates in general to an apparatus and method for testing particularly gases and, in particular, to a new and useful method and apparatus for detecting the reaction point between an indicator preparation and a substance formed by the reaction of the material to be identified with the indicator preparation.

2. Description of the Prior Art

At the present time, test tubes which are employed for the identification of materials comprise a colorless transparent material such as glass or plastic which contain an indicator preparation and sometimes a plurality of reagent layers. Testing devices are known which are wrapped with foil material which carry an outer foil coating which has been shrunk thereon. When a substance to be identified is admitted to the tube containing the indicated preparation, the reaction in the tube is a color reaction and in many instances, the original color of the indicator preparation does not border directly on the other color of the substance which is formed by the reaction of the material to be identified with the indicator preparation. In such instances, a transition zone of varying length forms between the original color and the color of the substance formed by the reaction between the unidentified material and the indicator preparation. The color of this transition zone may be heterogeneous or it may itself possess a certain color. When working in a testing procedure in which the location of the separation zone between the preparation indicator and the substance formed by the reaction of the substance to be identified, the transition zone which has a width of varying size makes the evaluation of the indication considerably more difficult.

SUMMARY OF THE INVENTION

In accordance with the present invention, there is provided a method and apparatus which makes it possible to effect a more easily identifiable identification test. The apparatus of the invention advantageously comprises a test tube with a transparent tube wall and this tube wall is colored with a coating of, or provided with, the color of the transition zone which forms between the original color of the indicator preparation and the color of the indicator preparation which has been modified or reacted with the material which is to be identified. The tube in which the reaction takes place is either colored with or provided with a colored coating, for example, in the form of a thin foil which is formed around the tube. By making the tube or a coating thereon of a color of the transition zone this transition zone is obscured so that the separation point between the indicator preparation and the reacted substance is readily identified.

In the preferred method of the invention, a substance such as a gas is passed through a vessel having the indicator preparation therein and at a selected pressure and rate and the separating line which forms between the indicator preparation and a reacting substance formed by the reaction of the indicator preparation with the material to be identified is observed by viewing through a transparent object of the color of an intermediate zone which normally forms between the reacted substance and the indicator preparation.

Accordingly, it is an object of the invention to provide an improved tube for testing substances which react to form a color indication with a reaction preparation to form a reacted substance, having a distinct color from the reaction preparation and a transition zone between the reaction preparation and the distinctly colored reacted substance; and which includes a wall for viewing of the reaction having a color of the intermediate color material.

A further object of the invention is to provide a method for establishing color reaction zones particularly in determining identification of gases which are directed through a tube containing a reaction preparation comprising, viewing the reaction through a transparent object of the color comparable to the color of a transition zone formed between the reaction preparation and a reacted substance formed by the unidentified material.

A further object of the invention is to provide a device for testing color reactions which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the Drawing:

FIG. 1 is a transverse sectional view of a testing apparatus for identifying gases of the prior art; and FIG. 2 is a view of the apparatus shown in FIG. 1 indicating the changes in a color separation point by the use of the invention.

GENERAL DESCRIPTION OF THE PREFERRED EMBODIMENT

Referring to the drawing, as shown in FIG. 1 which shows the prior art, there is provided a test tube 10 which contains an indicator preparation throughout the interior and this indicator preparation is shown as having a color, for example, which may be white, as indicated at 3. A substance such as a gas is directed in the direction of the arrow 12 through the inlet end of the tube 10, for example, by applying a suction to the opposite end of the tube 10. When the testing has proceeded at the desired rate and pressure and temperature conditions, the substance to be identified forms a color 1 with the reaction preparation which, in the example shown, is assumed to be brown. The part of the indicated preparation which has not reacted with the substance which is to be identified, is indicated by the white color 3 and between the indicator preparation color 3 and the reacted substance color 1, there is a transition zone or an intermediate color zone of a color 2, for example, which may be green. In this intermediate zone, the complete conversion reaction has not taken place for whatever the testing reason may be.

In accordance with the invention, there is provided a testing tube device 10' which includes, for example, a transparent tube 6 which is provided with a viewing wall of a color comparable to the color 2 of the intermediate zone. In the embodiment shown, this is obtained by wrapping or applying a foil 7 of a transparent material which is stained in a green color comparable to the intermediate zone color 2 of FIG. 1.

Thus, with the inventive construction, if the same quantity of gas to be identified is directed into the testing tube device 10' which is constructed in accordance with the invention, the same sort of color reaction takes place as indicated in FIG. 1 but because the viewing wall or viewing object is colored the same color as the transition zone 2, this zone is no longer recognizable. Thus, the reading of the tube is facilitated because the color of the material which has reacted designated 4, comparable to the color 1 in FIG. 1, apparently borders directly on a color area 5 which includes both the reaction preparation color, similar to the color 3 of FIG. 1, and the intermediate zone color 2 of FIG. 1.

In addition, because of the color viewing wall, the color in the color zone 4 would appear darker.

While a specific embodiment of the invention has been shown and described in detail to illustrate the application of the principles of the invention, it will be understood that the invention may be embodied otherwise without departing from such principles.

What is claimed is:

1. In a method for detecting the presence of a substance in a fluid in which the fluid is passed through an indicator tube containing a reagent which reacts with said substance to produce a color different from the color of the unreacted reagent, wherein the improvement comprises viewing the indicator tube through a transparency which is colored differently from the colors of the reacted and the unreacted reagent.

2. A method according to claim 1, wherein the transparency comprises the wall of the vessel.

3. A method according to claim 1, wherein the transparency comprises a separate foil material through which the observation is taken.

4. In a device for detecting the presence of a substance in a fluid which includes an indicator tube containing a reagent which reacts in a reaction zone with the substance to produce a color different from the color of the unreacted reagent, the improvement comprising wall viewing means associated with said indicator tube having a viewing wall in the reaction zone of a color different from the colors of the reacted and the unreacted agent.

5. In a device according to claim 4, wherein said viewing wall comprises a portion of the wall of said tube.

6. In a device according to claim 4, wherein said viewing wall comprises a separate foil material, said tube wall being of clear transparent material.

* * * * *